United States Patent
Davis et al.

(10) Patent No.: US 6,516,336 B1
(45) Date of Patent: Feb. 4, 2003

(54) METHOD AND SYSTEM FOR USING A TWO-TIERED CACHE

(75) Inventors: Charlotte Elizabeth Davis, Chapel Hill, NC (US); Bradford Austin Fisher, Carrboro, NC (US); Jonathan Scott Greenfield, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/392,035

(22) Filed: Sep. 8, 1999

(51) Int. Cl.⁷ .............................................. G06F 15/14
(52) U.S. Cl. ...................... 709/201; 709/203; 709/220; 709/223; 707/8
(58) Field of Search ................................ 709/201, 203, 709/220, 223; 707/8

(56) References Cited

U.S. PATENT DOCUMENTS

| | | | | |
|---|---|---|---|---|
| 5,295,243 A | * | 3/1994 | Robertson et al. | 345/649 |
| 5,414,812 A | * | 5/1995 | Filip et al. | 707/103 R |
| 5,630,125 A | * | 5/1997 | Zellweger | 707/102 |
| 6,052,720 A | * | 4/2000 | Traversat et al. | 709/220 |
| 6,105,063 A | * | 8/2000 | Hayes, Jr. | 709/222 |
| 6,259,451 B1 | * | 7/2001 | Tesler | 345/419 |

* cited by examiner

*Primary Examiner*—David Wiley
*Assistant Examiner*—Frantz B. Jean
(74) *Attorney, Agent, or Firm*—Jeanine S. Ray-Yarletts; Marcia L. Doubet (57) ABSTRACT

A method, system, and computer program product code using a two-tiered cache for hierarchically structured data. The present invention significantly reduces the frequency of computationally intense processing used to retrieve hierarchically structured data and reduces the system cache storage requirements for maintaining coalesced images.

21 Claims, 7 Drawing Sheets

FIG. 6
User Requests to View Preferences With Refresh

METHOD AND SYSTEM FOR USING A TWO-TIERED CACHE

BACKGROUND OF THE INVENTION

1. Field of the Invention

The present invention relates to a computer system, and deals more particularly with a method, system, and computer program product for using a two-tiered cache for storing and accessing hierarchical data, in order to minimize memory usage and improve performance.

2. Description of the Related Art

In the distributed client/server environment, there is a need to disseminate information within a company or corporation that is required by users for everyday operation. This information typically includes such things as accounting information, computer configuration information, etc., and is typically available on one or more servers which are accessed by the users. Since companies, particularly large corporations, are often organized hierarchically (such as divisions, departments, etc.), each of these hierarchical levels may specify information pertinent to that level, where each lower level of hierarchical information augments or overrides the level(s) above it. In particular, this hierarchical approach to specifying information is often used for computer configuration information. In this scenario, each user of the company systems accesses the information provided by the higher levels of the hierarchy, for example to use when connecting to the company network or when installing software on his computer. The user at this point occupies the lowest level of the hierarchy, and may customize the information obtained from the hierarchy above him. These customized values are often referred to as "user preferences" and may be unique to any user within the hierarchy.

Figure 1:
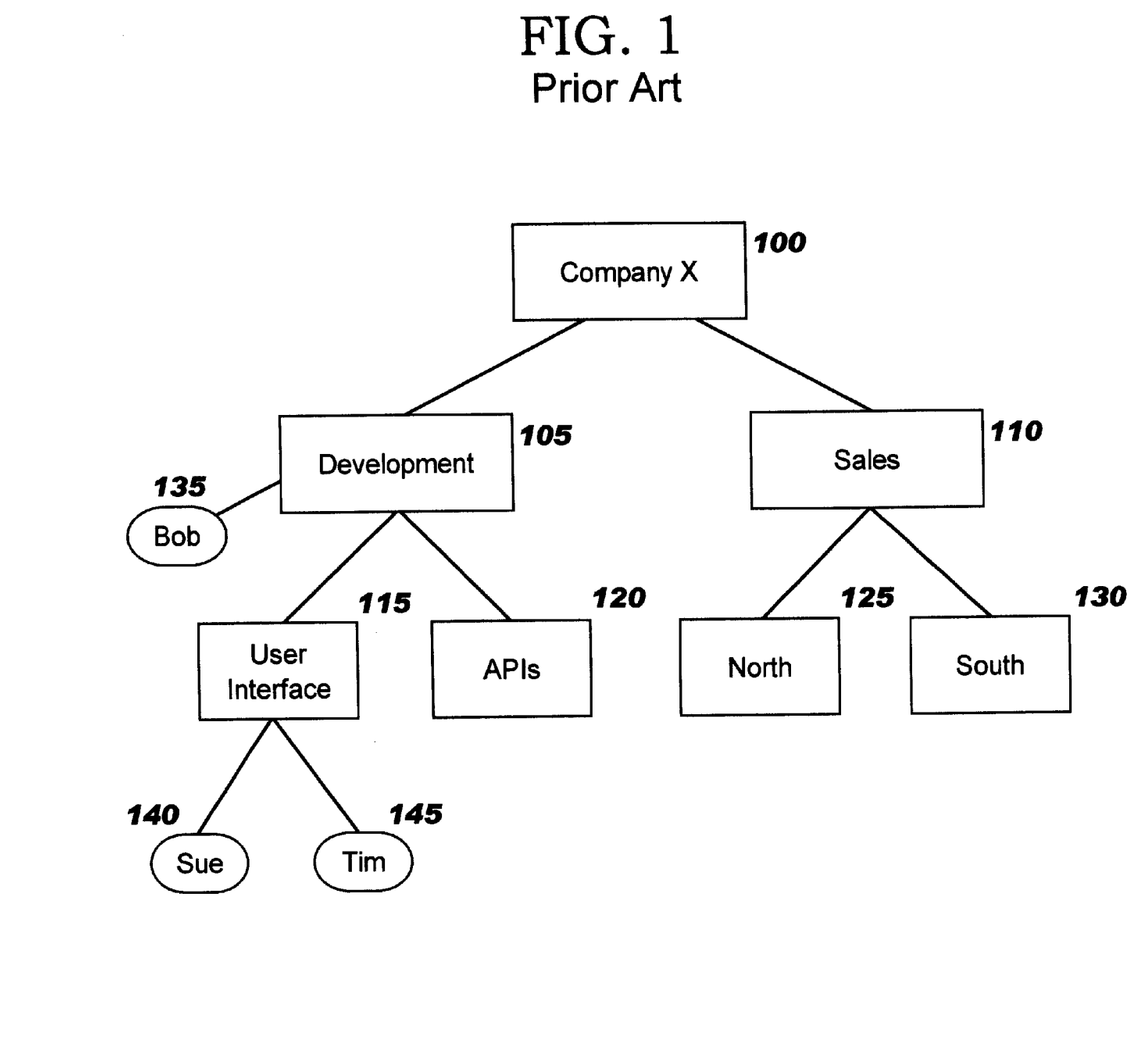
FIG. 1 is a block diagram example representing a hierarchically structured organization and a hierarchical structure for storing data associated with the organization in which the present invention may be practiced.

FIG. 1 is an example of this type of hierarchical structure. This structure represents hierarchically stored information, which typically mirrors the hierarchy of the organization. Company X 100 represents information stored for the corporate or highest level of the company. Any information defined at this level typically pertains to all elements of the hierarchy throughout the company, from organizations to individual users, because corporate settings tend to be broad in scope and define boundaries for the subordinate levels to follow. In this example, there is a subordinate level in Company X 100 which represents the development organization 105 and the sales organization 110. At this level, each subordinate organization uses the information from Company X 100 and may specify additional information to be used by its subordinate levels. Either or both of the development and sales organizations may also make changes (i.e. augmenting or overriding defined values) to the original information from the Company X level. This changed information is then made available to the subordinates of the level at which the change was made.

Moving down the hierarchy to the next level under development 105, we have two more organizations or possibly groups (such as a department of employees): (1) the user interface group 115 and (2) the API group 120. Both of these groups will inherit the information provided by the higher levels in this hierarchy. These groups also may add or modify information to further refine the data from the higher levels of the hierarchy, where these changes are then made available to the subordinate levels of the hierarchy. In this example, the subordinates to the user interface group 115 are the users (140, 145) of the company resources. Here, for example, Sue 140 inherits all the information available from following a path from the node 140 representing Sue up through and including all of the higher levels in the hierarchy.

The information provided to Sue 140 may include values for things such as system configuration attributes, including the colors displayed on her screen and the size of the windows on her display. Sue may choose to override these values (or any values provided by a higher level) in order to customize her display to her own preferences. In doing so, Sue has now created her own customized set of values representing a coalesced version of all the higher level values from the highest level 100 down to and including the values Sue 140 provides. This customized set of information is typically stored in a database or other repository on a server for access by the user any time he needs to use the information. (It should be noted that overriding values defined at a higher level of the hierarchy may in some cases be limited to a subset of all the defined values, since some higher level values may be mandatory.)

When a user of a client machine requests data that is stored in a hierarchical structure (such as the example for FIG. 1), what the user wants in response is the "coalesced" set of data. As used herein, a coalesced set of data refers to gathering all the data in the hierarchy, and merging data together such that the value for any given attribute is set by the lowest level in the hierarchy which has that attribute defined. From the user's point of view, he receives a complete set of data, which is really a composite of the actual data from the user level and all levels above it in the hierarchical chain.

These complex types of stored data may impact overall performance of the server when information is retrieved since the coalescing of the stored data may involve a combination of several memory accesses as well as disk retrievals to collect, and then coalesce, all the necessary information before responding to a user request. For example, if Sue requests information for the hierarchy of FIG. 1, separate disk accesses (which may further require round trips through a distributed network) may be needed to retrieve the information for Company X 100, Development 105, User Interface 115, and finally for Sue 140.

While only a simple hierarchy is shown in FIG. 1, many more levels (with many nodes at each level) may exist in an organization or corporation. Performing multiple disk accesses to retrieve information for each level is a computationally expensive operation. In addition, having to continually recalculate the coalesced image of the data when changes occur is compute intensive. Conversely, caching the complete set of coalesced data for every user is very storage or memory intensive and requires a complete recoalescence any time data represented in the coalescence is changed.

Accordingly, what is needed is a technique that avoids the performance penalty of this continual recalculation, and avoids the storage penalty of storing large amounts of coalesced data.

SUMMARY OF THE INVENTION

An object of the present invention is to provide a technique which avoids continual recalculation for coalescing complex hierarchical data and minimizes the impact on performance and memory consumption in a client/server environment.

Another object of the present invention is to provide this technique using a two-tiered cache.

Yet another object of the present invention is to provide this technique in a manner that allows a server to determine if a set of coalesced cached values is out-of-date with the data store it represents.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a method, system, and computer program product for use in a computing environment for using a two-tiered cache for storing and accessing hierarchical data. This technique comprises: providing a hierarchical structure of data comprising a top-level node, one or more intermediate levels having one or more intermediate-level nodes, and one or more user nodes, wherein each of the user nodes is a child node of the top-level node or one of the intermediate-level nodes, wherein the hierarchical structure is stored in a data repository accessible in the computing environment and wherein each of the nodes has a corresponding last update timestamp stored in the repository, the last update timestamp for the user nodes and the top-level node representing a last update to one or more data values of the node and the last update timestamp for the intermediate nodes representing an update of data values of the intermediate node or a parent of the intermediate node; creating coalesced data images (CDIs) for each of the top-level or intermediate-level nodes which is a group node, wherein a particular node is one of the group nodes when the particular node has one or more of the user nodes as a child, and wherein the CDI for the particular node comprises a coalescence of data values for the particular node, the top-level node, and all of the intermediate-level nodes in a hierarchical path from the particular node to the top-level node; storing the created CDIs in a central data cache along with a CDI timestamp for each of the stored CDIs wherein the CDI timestamp for each of the CDIs is set to the corresponding last update timestamp for the corresponding node; and storing user data for each of one or more users in a client cache for the user along with a client cache timestamp, wherein: each of the users is associated with a selected one of the user nodes; the client cache timestamp is set to the corresponding last update timestamp for the corresponding user node; and the stored user data is uncoalesced.

This technique may further comprise updating one or more of the data values for a selected node, where this updating further comprises: applying an update to the data values in the repository; updating the last update timestamp corresponding to the selected node; determining whether the selected node is one of the group nodes; and propagating the updated timestamp to each of the group nodes subordinate to the selected group node in the hierarchical structure when the determination has a positive result.

Preferably, this technique further comprises retrieving a coalesced result in response to a request from a particular one of the users, wherein the request may specify a refreshed result or an unrefreshed result.

Retrieving a refreshed result preferably further comprises: retrieving the user data for the particular user; retrieving the CDI for the group node of which the user node is one of the children; and merging the retrieved user data with the CDI of the parent node. Retrieving the user data preferably further comprises: retrieving the user data from the client cache when (1) the client cache for the particular user exists and (2) the client cache timestamp for the particular user's client cache is not older than the last update timestamp corresponding to the particular user's user node in the repository; and populating the particular user's client cache otherwise. This populating further comprises: retrieving the user data from the particular user's user node in the repository; storing the retrieved user data in the client cache for the user; and setting the client cache timestamp for the user to the last update timestamp for the corresponding user node. Retrieving the CDI for the group node preferably comprises: retrieving the CDI from the central data cache when (1) the CDI for the group node exists and (2) the CDI timestamp for the CDI is not older than the last update timestamp corresponding to the group node in the repository; and creating the CDI otherwise. Creating the CDI further comprises: retrieving the data values from the repository for the group node, the top-level node, and all of the intermediate-level nodes in the hierarchical path from the group node to the top-level node; coalescing the retrieved data values; storing the coalesced data values as the CDI for the group node in the central data cache; and setting the CDI timestamp for the CDI to the last update timestamp for the corresponding group node. This creating may further comprise repeating this process for each of the group nodes above this group node in the hierarchical path until reaching a first of the group nodes for which the CDI timestamp for the CDI of this first group node is not older than the last update timestamp corresponding to the group node in the repository.

In one aspect, the retrieving of user data from the client cache determines whether the client cache timestamp for the particular user's client cache is different from the last update timestamp corresponding to the particular user's user node in the repository rather than whether the client cache timestamp is not older than the last update timestamp, and the retrieving of the CDI from the central data cache determines whether the CDI timestamp for the CDI is different from the last update timestamp corresponding to the group node in the repository rather than whether the CDI timestamp is not older than the last update timestamp.

Retrieving an unrefreshed result preferably further comprises: retrieving the user data for the particular user; retrieving the CDI for the group node of which the user node is one of the children; and merging the retrieved user data with a parent CDI associated with a parent node of the user node. Retrieving the user data further comprises: retrieving the user data from the client cache when the client cache for the particular user exists; and populating the particular user's client cache otherwise. This populating further comprises: retrieving the user data from the particular user's user node in the repository; storing the retrieved user data in the client cache for the user; and setting the client cache timestamp for the user to the last update timestamp for the corresponding user node. Retrieving the CDI further comprises: retrieving the CDI from the central data cache when the CDI for the group node exists; and creating the CDI otherwise. Creating the CDI further comprises: retrieving the data values from the repository for the group node, the top-level node, and all of the intermediate-level nodes in the hierarchical path from the group node to the top-level node; coalescing the retrieved data values; storing the coalesced data values as the CDI for the group node in the central data cache; and setting the CDI timestamp for the CDI to the last update timestamp for the corresponding group node.

The present invention will now be described with reference to the following drawings, in which like reference numbers denote the same element throughout.

DESCRIPTION OF THE PREFERRED EMBODIMENT

Figure 2:
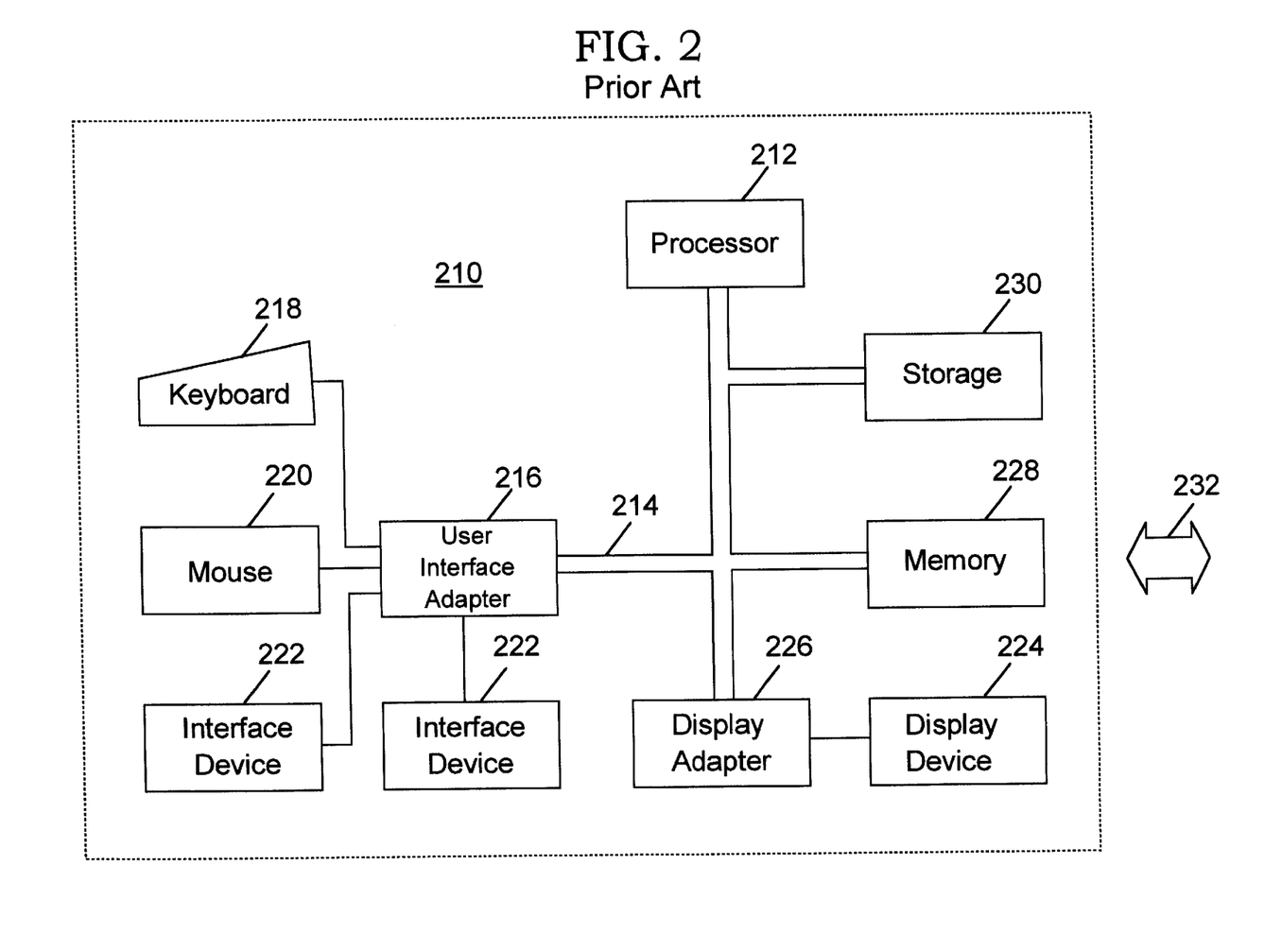
FIG. 2 is a block diagram of a computer workstation environment in which the present invention may be practiced.

FIG. 2 illustrates a representative workstation hardware environment in which the present invention may be practiced. The environment of FIG. 2 comprises a representative single user computer workstation 210, such as a personal computer, including related peripheral devices. The workstation 210 includes a microprocessor 212 and a bus 214 employed to connect and enable communication between the microprocessor 212 and the components of the workstation 210 in accordance with known techniques. The workstation 210 typically includes a user interface adapter 216, which connects the microprocessor 212 via the bus 214 to one or more interface devices, such as a keyboard 218, mouse 220, and/or other interface devices 222, which can be any user interface device, such as a touch sensitive screen, digitized entry pad, etc. The bus 214 also connects a display device 224, such as an LCD screen or monitor, to the microprocessor 212 via a display adapter 226. The bus 214 also connects the microprocessor 212 to memory 228 and long-term storage 230 which can include a hard drive, diskette drive, tape drive, etc.

The workstation 210 may communicate with other computers or networks of computers, for example via a communications channel or modem 232. Alternatively, the workstation 210 may communicate using a wireless interface at 232, such as a CDPD (cellular digital packet data) card. The workstation 210 may be associated with such other computers in a local area network (LAN) or a wide area network (WAN), or the workstation 210 can be a client in a client/server arrangement with another computer, etc. All of these configurations, as well as the appropriate communications hardware and software, are known in the art.

Figure 3:
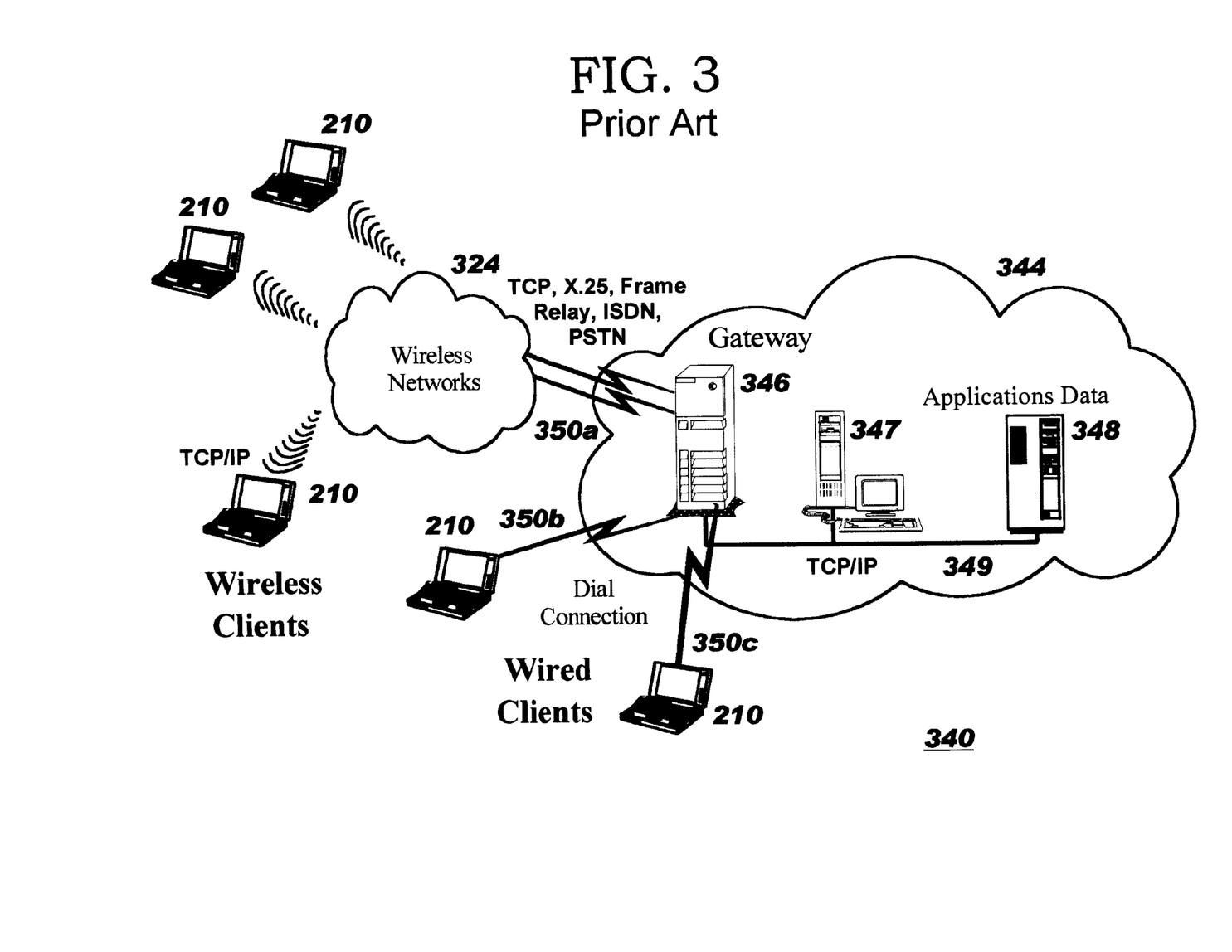
FIG. 3 is a diagram of a networked computing environment in which the present invention may be practiced.

FIG. 3 illustrates a data processing network 340 in which the present invention may be practiced. The data processing network 340 may include a plurality of individual networks, such as wireless network 342 and network 344, each of which may include a plurality of individual workstations 210. Additionally, as those skilled in the art will appreciate, one or more LANs may be included (not shown), where a LAN may comprise a plurality of intelligent workstations coupled to a host processor.

Still referring to FIG. 3, the networks 342 and 344 may also include mainframe computers or servers, such as a gateway computer 346 or application server 347 (which may access a data repository 348). A gateway computer 346 serves as a point of entry into each network 344. The gateway 346 may be preferably coupled to another network 342 by means of a communications link 350a. The gateway 346 may also be directly coupled to one or more workstations 210 using a communications link 350b, 350c. The gateway computer 346 may be implemented utilizing an Enterprise Systems Architecture/370 available from the International Business Machines Corporation ("IBM"), an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.)

The gateway computer 346 may also be coupled 349 to a storage device (such as data repository 348). Further, the gateway 346 may be directly or indirectly coupled to one or more workstations 210.

Those skilled in the art will appreciate that the gateway computer 346 may be located a great geographic distance from the network 342, and similarly, the workstations 210 may be located a substantial distance from the networks 342 and 344. For example, the network 342 may be located in California, while the gateway 346 may be located in Texas, and one or more of the workstations 210 may be located in New York. The workstations 210 may connect to the wireless network 342 using a networking protocol such as the Transmission Control Protocol/Internet Protocol ("TCP/IP") over a number of alternative connection media, such as cellular phone, radio frequency networks, satellite networks, etc. The wireless network 342 preferably connects to the gateway 346 using a network connection 350a such as TCP or UDP (User Datagram Protocol) over IP, X.25, Frame Relay, ISDN (Integrated Services Digital Network), PSTN (Public Switched Telephone Network), etc. The workstations 210 may alternatively connect directly to the gateway 346 using dial connections 350b or 350c. Further, the wireless network 342 and network 344 may connect to one or more other networks (not shown), in an analogous manner to that depicted in FIG. 3.

Software programming code which embodies the present invention is typically accessed by the microprocessor 212 of the workstation 210 and server 347 from long-term storage media 230 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 228, and accessed by the microprocessor 212 using the bus 214. The techniques and methods for embodying software programming code in memory, on physical media, and/or distributing software code via networks are well known and will not be further discussed herein.

A user of the present invention at a client computer may connect his computer to a server using a wireline connection, or a wireless connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The user's computer may be any type of computer processor, including laptop, handheld or mobile computers; vehicle-mounted devices; desktop computers; mainframe computers; etc., having processing and communication capabilities. The remote server, similarly, can be one of any number of different types of computer which have processing and communication capabilities. These techniques are well known in the art, and the hardware devices and software which enable their use are readily available. Hereinafter, the user's computer will be referred to equivalently as a "workstation", "device", or "computer", and use of any of these terms or the term "server" refers to any of the types of computing devices described above.

In the preferred embodiment, the present invention is implemented as one or more modules (also referred to as code subroutines, or "objects" in object-oriented programming) of a computer software program (or programs) which provides a two-tiered caching technique to avoid performance impacts and to avoid storing large amounts of data in memory. The invention may be used in the Internet environment or in a corporate intranet, extranet, or any other network environment. The program code of the preferred embodiment may be implemented as objects in an object-oriented programming language, or in a conventional procedurally-oriented language, or in a mix of object-oriented and procedural language code. In the preferred embodiment, the code of the present invention operates on the server. Alternatively, a portion of the code may operate on the client machine (e.g. to perform the coalescing of a user's preferences with data inherited from higher levels).

A server machine in the client/server environment typically maintains frequently accessed information in a system memory cache for improved performance. For complex data structures, such as a hierarchy of data as has been discussed, the cached image may be comprised of the coalesced data from all levels of the hierarchy. The problem with maintaining a cached image for a full hierarchy of data is that the image must be recalculated (i.e. re-coalesced) each time a change is made to the information which is represented by the cached image, in order to incorporate the changes into the image. With reference to the example hierarchy of FIG. 1, a coalescence of the full hierarchy (according to the prior art) would exist for each user, to include unique information for this user. The coalescing of data for each user may result in multiple cached images that are essentially the same, except for the individual user's unique values. In addition, coalesced images may be stored for each intermediate level (representing the hierarchical path to the top of the structure). System performance is affected by all the required frequent coalescing of data and the memory utilization is affected since multiple versions of the hierarchical data are stored in the system memory cache.

According to the preferred embodiment of the present invention, this problem is solved by keeping two levels of cache: (1) a central cache of coalesced images, and (2) a client cache for uncoalesced client images. In the preferred embodiment, these two caches exist in the same physical memory cache on the server machine and are logically separated. Optionally, these two caches may be physically separate memory caches on the same server machine or may be located on physically separate machines (including storing a client's uncoalesced data locally on the client machine).

Figure 4:
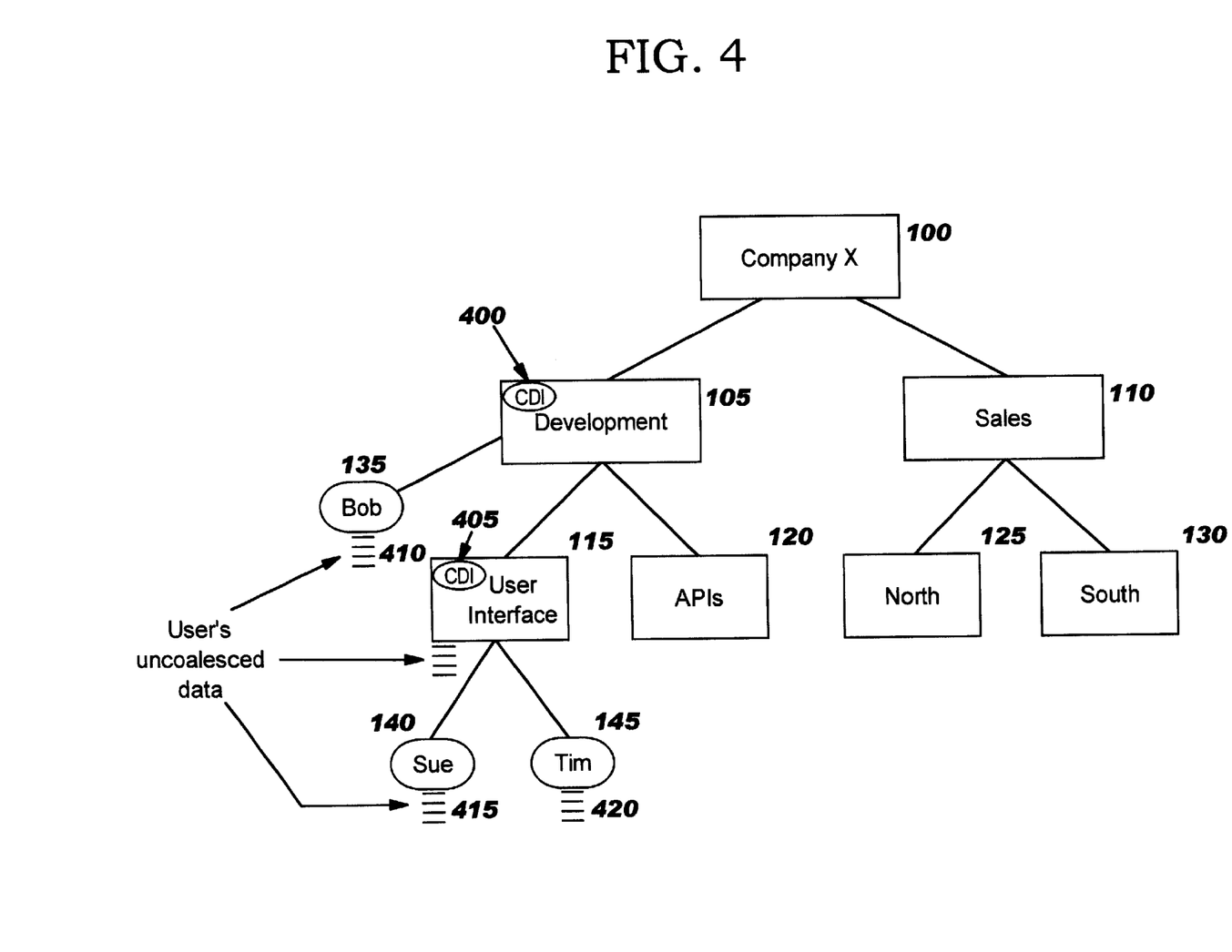
FIG. 4 depicts the hierarchy of FIG. 1, showing how a two-tiered cache is used with this hierarchy, according to the present invention.

According to the present invention, a coalesced data image (CDI) of hierarchical data is kept for all levels of the hierarchy which have users (or more generally, terminating resources) beneath them. Each user who provides customized data to override the inherited data in a CDI has his unique changes saved in a client cache (where the changes are stored uncoalesced). (A user's unique changes are referred to herein as the user's "uncoalesced data".) When the user requests the coalesced data for all the information represented by the hierarchy, the CDI of the user's immediate parent (i.e. the next higher level of the hierarchy) is retrieved from the central cache and is coalesced with the uncoalesced image in the client cache. The result is a single, coalesced image comprised of all the values provided by the hierarchy as well as the unique values specified by the user which override or augment values inherited from the hierarchy. In this manner, the volatility of the central cache is significantly reduced since each CDI does not include the more volatile client information. The amount of memory is significantly reduced since multiple users (such as Sue 140 and Bob 145) can share the same CDI. By caching a coalesced image representing all levels of a hierarchy above a particular user (such as CDI 400 for the Development level 105 above user Bob 135), or multiple users (such as CDI 405 for the User Interface level 115 above user Sue 140 and Tim 145), and then applying a user's uncoalesced data to the appropriate CDI, the user obtains a full set of information with only two storage retrievals (one for the CDI, and one for the user's uncoalesced data)—assuming the CDI is up-to-date.

Note that while the hierarchy discussed herein is directed toward configuration data in an organization, this is merely illustrative. A typical data store may contain hierarchically structured information about various types of resources. (Examples of a resource could be a user, group, machine, etc.) From the user's point of view, these resources are related logically in a hierarchical group structure. So, in the general case, a resource might be a member of a group, and that group might be a member of a higher level group, etc.

The preferred embodiment of the present invention will now be discussed with regard to FIGS. 4–7.

FIG. 4 shows how the two-tiered cache of the present invention is used with hierarchically stored data such as the example depicted in FIG. 1. As discussed earlier, a coalesced data image of hierarchical data is kept for all levels of the hierarchy which have users beneath them. Thus, in FIG. 4, a coalesced data image 400, 405, is kept in the central cache for the "Development" 105 and "User Interface" 115 nodes because these groups have users Bob 135, and Sue 140 and Tim 145, respectively. A client cache is kept for each user (Bob 135, Sue 140, Tim 145), and this client cache provides uncoalesced data (410, 415, 420, respectively) to override the data stored in the CDI for the user's immediate parent. The other nodes of the example hierarchy have no users depicted, and thus none of these nodes has an associated CDI. The coalesced data image 400 for the Development group 105 is comprised of all information from the Development group and all levels above it (i.e. the Company 100). The coalesced data image 405 for the User Interface group 115 is comprised of all the information from the User Interface group 115, the Development group 105, and the Company 100. When user Sue 140, for example, requests the coalesced data from the hierarchy, the CDI 405 from her immediate parent (User Interface 115) is coalesced with the uncoalesced data 415 from Sue's client cache and returned to Sue 140.

The coalesced data in a CDI typically changes infrequently since it contains data provided at higher, less volatile levels of a hierarchy. That is, it can be expected that a department changes its information less frequently than does a user, that a division changes its information less frequently than a department, etc.

According to the present invention, CDIs stored in the central cache are read-only in that changes are never made by users directly in the data represented by a CDI. At some point in time, an administrator may have a need to change some or all of the data in the hierarchy. (Administrators typically have authority to make changes to data at various levels of the hierarchy, and do not have the same limitations as other users.) Should an administrator change higher level data (i.e. non-user-level data such as corporate-level data, division-level data, etc.) that is stored on the server, the CDI will be out-of-date with the stored data. By requesting the hierarchical data with the refresh option (discussed in detail below), the present invention will cause the server to re-coalesce all the data into a new coalesced data image in the central cache. Note that multiple new CDIs may be created during a refresh, when the changed data is represented in more than one CDI. For example, information defined at Company level 100 is reflected in CDI 400 as well as CDI 405. Similarly, information defined at Development level 105 is reflected in both of these CDIs. Thus, if an administrator changes Company 100 data or Development 105 data, both CDIs will become out-of-date and will be re-coalesced on a refresh issued from a level beneath User Interface 115.

The logic with which the preferred embodiment of the present invention is implemented will now be discussed with reference to FIGS. 5–7.

Figure 5:
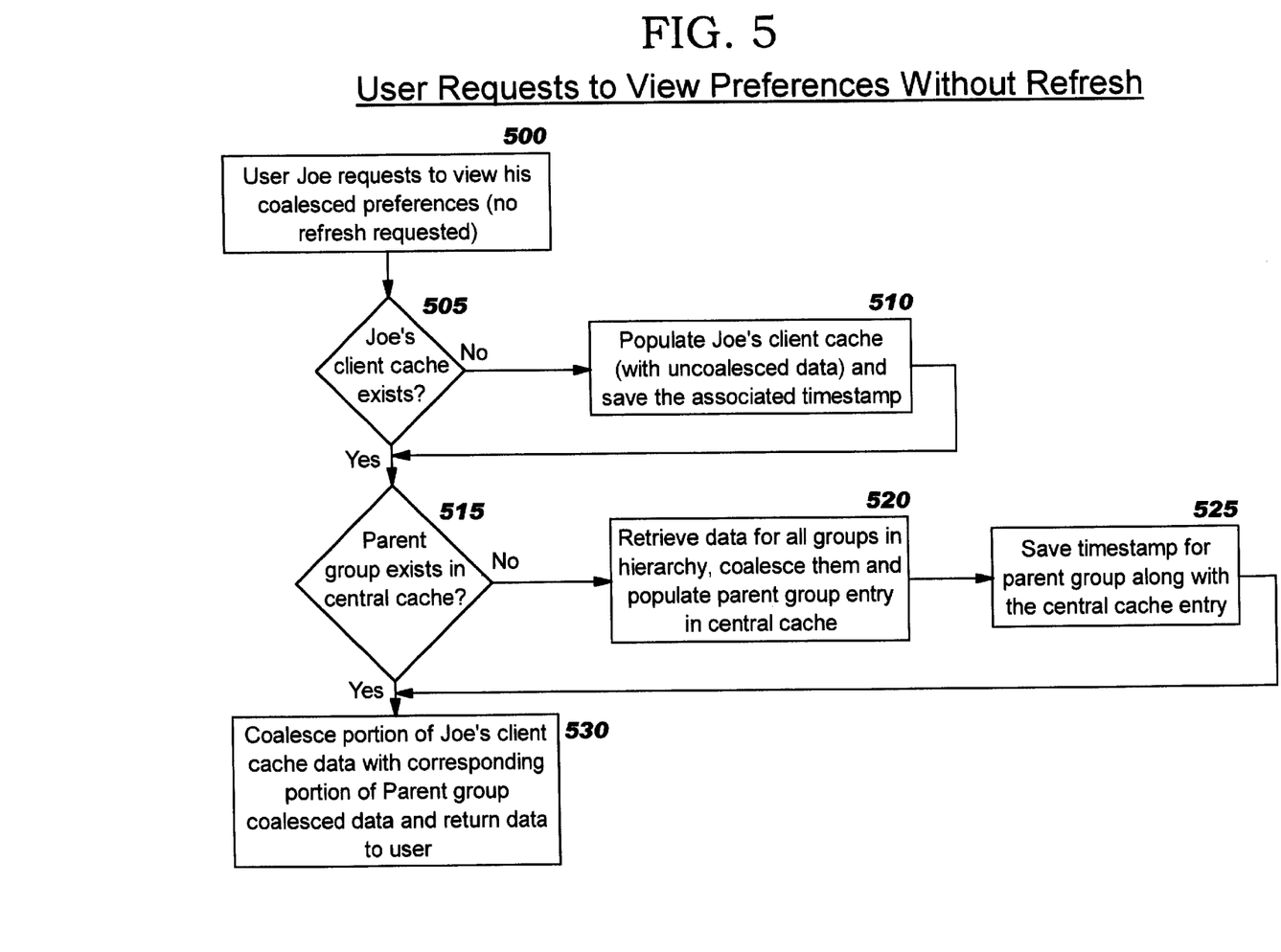
FIGS. 5–7 provide flow charts illustrating the preferred embodiment of the logic used to implement the present invention.

FIG. 5 provides a flow chart illustrating the logic with which a user requests coalesced data from a server without requesting a refresh. In this example, the user "Joe" at Block 500 issues a request to a server for data that is coalesced from complex, hierarchical data. The desired coalesced data in this example is comprised of all the data stored in the hierarchy including any data previously specified by Joe (e.g. additional values or overridden values). At Block 505, a determination is made as to whether a client cache exists for this user Joe. If there is no client cache (a "No" at Block 505), then at Block 510 the client's uncoalesced data is retrieved from the data store (i.e. disk file, database, etc.) and used to populate a client cache entry for this user. A timestamp representing the last update to this user's uncoalesced data in the repository is also stored-in the user's client cache. If, at Block 505, a client cache for this user does exist (a "Yes" result), then processing continues to Block 515.

At Block 515, a test is made to determine if a CDI for the parent (i.e the next higher level above the requesting user) exists in the central cache. If not, then processing continues to Block 520 where all the data for the higher-level groups in the hierarchy is gathered, from the current user's parent level to the highest level. The collected information is then coalesced and stored as a CDI in the central cache. A timestamp associated with this CDI is saved in the central cache at Block 525, where the value of this timestamp is set to the last update time of the data at this level in the repository.

If a CDI for the parent group exists (a "Yes" result at Block 515), or after creating a CDI at Blocks 520 and 525, processing continues at Block 530. At Block 530, the user's uncoalesced data in the client cache is coalesced with the CDI for the user's parent, and the result is returned to the user. Note that the logic of FIG. 5 made no determination as to whether values in an existing CDI were out-of-date with the corresponding data stored in the data repository since the user's request (Block 500) did not request a refresh of any previously cached values.

Figure 6:
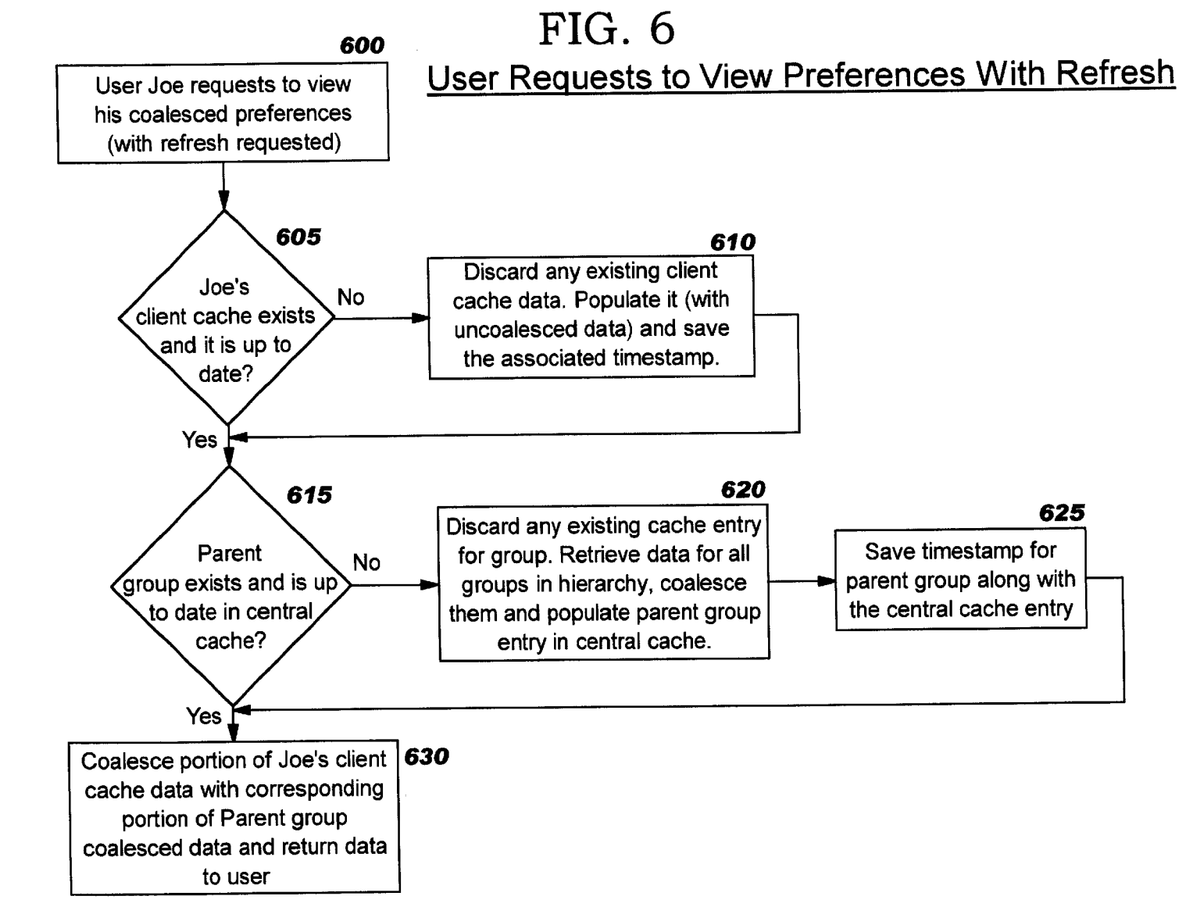

FIG. 6 provides a flow chart illustrating the preferred embodiment of the logic for processing a user's request for coalesced data which will be refreshed (if the appropriate CDI and/or client cache is out-of-date). The user (at Block 600) issues a request for the coalesced preferences (as before), but now requests a refresh of any out-of-date cached values. Block 605 determines if the client cache for this user is up-to-date. A client cache for the requesting user may not exist when the request for a refresh is received. In that case, a client cache is built which, by default, is refreshed. Otherwise, a comparison is made between the timestamp of this user's client cache and the timestamp indicating the last update to the user's stored data in the data repository. If the existing client cache for this user is not up-to-date (i.e. the client cache timestamp is older than the timestamp of the last update to the user's stored data), then at Block 610, any existing client cache data is discarded. The user's client cache is then populated with current, uncoalesced data, and the timestamp indicating the last time the user's stored data was updated is saved in the client cache. If the user's client cache exists and is not out-of-date, processing continues to Block 615.

Block 615 determines if the CDI for the parent group exists in the central cache and is up-to-date. As with the client cache, if the CDI for the parent group does not exist, then a new parent CDI is created in the central cache at Block 620 which, by default, is refreshed. Or, if the CDI for the parent group is not up-to-date (i.e. the CDI timestamp for the parent group is older than the timestamp of the last update at this level in the repository), then Block 620 discards any existing CDI for the parent group and gathers all the data for the higher-level groups in the hierarchy from the repository, including the parent group. The collected data is coalesced into a (new or refreshed) CDI, and the central cache is populated with this CDI. Block 625 saves the timestamp associated with this CDI in the central cache, where the CDI timestamp is the time of the last update to data for this level or for one of the higher-level groups coalesced into this CDI, whichever is later, in the repository. Optionally, this checking of the parent group CDI may be repeated for each next-higher-level group CDI in the path to the top level, until reaching a CDI which is up-to-date.

Block 630 is reached following a positive result at Block 615 or completion of Block 625. At Block 630, the CDI of the user's parent group is coalesced with the uncoalesced data in the user's client cache, and the result is returned to the user.

Figure 7:
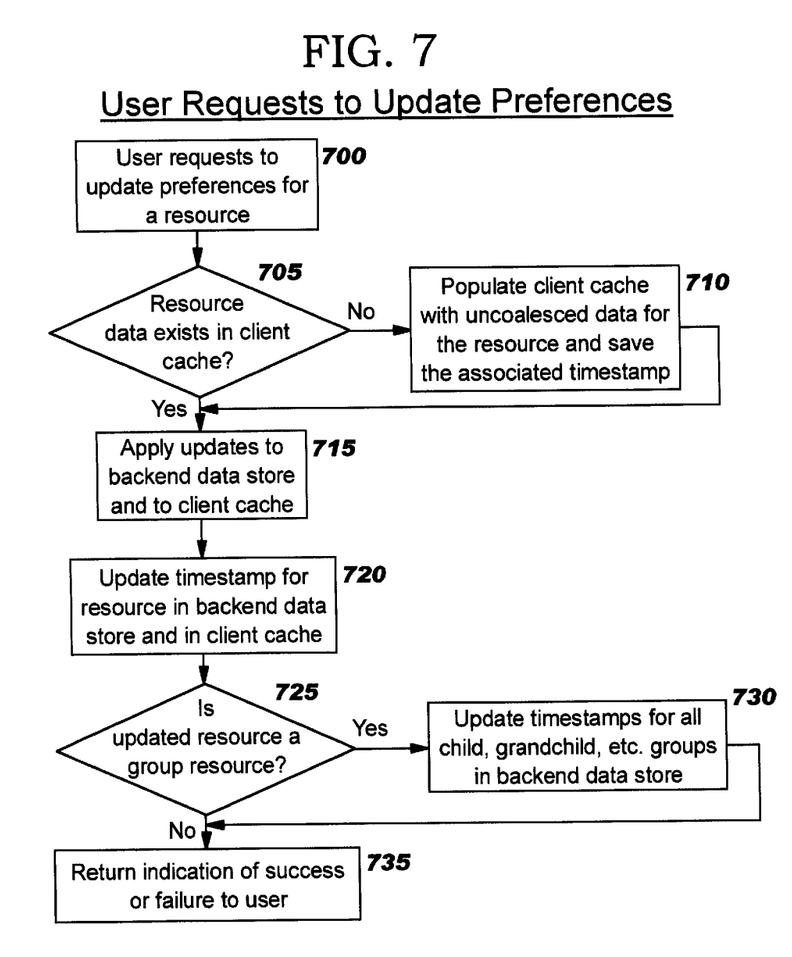

FIG. 7 provides a flowchart illustrating the logic with which the preferred embodiment processes a user request to update data stored in the data repository. At Block 700, the user issues a request to update data which is stored in a repository. At Block 705, a determination is made as to whether the data being updated exists in the client cache for this user. If not, then at Block 710 the user's client cache is populated with the existing uncoalesced data and the timestamp of the last update to the user's stored data is saved in the client cache. The user's specified updates are made to the stored data as well as to the client cache at Block 715. At Block 720, the timestamp of the client's data in the repository as well as the client cache timestamp are updated to reflect the time of the current update. Block 725 determines if the updated information is group-level data. If so, then an updated timestamp is propagated downward (Block 730) to all subordinate groups of the hierarchy below this updated group. That is, the last update time for the subordinate groups in the repository is set to the time of the current update. By changing the timestamps of the stored data for the group and its subordinate groups, a refresh of any CDIs for these subordinate data levels will occur with the nekt user request that specifies a refresh. Block 735 returns an indication of success or failure of the update operation to the user.

In an optional enhancement of the preferred embodiment, a randomly-generated sequence number may be used as the "timestamp" values which have been discussed herein, instead of a conventional time value. This enhancement will be advantageous when more than one server application may be updating data values in the repository (and thus updating the associated timestamps), and enables avoiding clock synchronization discrepancies among the different applications. When this enhancement is used, the comparisons between timestamp values to determine if a stored CDI or client cache is up-to-date is replaced by a comparison to determine whether the timestamp values are different: if the values are different, then the stored data has been changed and thus is not up-to-date.

As has been demonstrated, the present invention provides advantageous techniques for storing and retrieving hierarchically structured data by creating a two-tiered cache. The technique defined herein for creating and accessing this two-tiered cache avoids the performance penalty and storage penalty of prior art solutions.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

We claim:

1. A computer program product embodied on a computer-readable medium in a computing environment, for using a two-tiered cache for storing and accessing hierarchical data, comprising:
   a hierarchical structure of data comprising a top-level node, one or more intermediate levels having one or more intermediate-level nodes, and one or more user nodes, wherein each of said user nodes is a child node of said top-level node or one of said intermediate-level nodes, wherein said hierarchical structure is stored in a data repository accessible in said computing environment and wherein each of said nodes has a corresponding last update timestamp stored in said repository, said last update timestamp for said user nodes and said top-level node representing a last update to one or more data values of said node and said last update timestamp for said intermediate nodes representing an update of data values of said intermediate node or a parent of said intermediate node;
   computer-readable program code means for creating coalesced data images (CDIs) for each of said top-level or intermediate-level nodes which is a group node, wherein a particular node is one of said group nodes when said particular node has one or more of said user nodes as a child, and wherein said CDI for said particular node comprises a coalescence of data values for said particular node, said top-level node, and all of said intermediate-level nodes in a hierarchical path from said particular node to said top-level node;
   computer-readable program code means for storing said created CDIs in a central data cache along with a CDI timestamp for each of said stored CDIs wherein said CDI timestamp for each of said CDIs is set to said corresponding last update timestamp for said corresponding node; and
   computer-readable program code means for storing user data for each of one or more users in a client cache for said user along with a client cache timestamp, wherein: each of said users is associated with a selected one of said user nodes; said client cache timestamp is set to said corresponding last update timestamp for said corresponding user node; and said stored user data is uncoalesced.

2. The computer program product according to claim 1, further comprising:
   computer readable program code means for updating one or more of said data values for a selected node, further comprising:
      computer readable program code means for applying an update to said data values in said repository;
      computer readable program code means for updating said last update timestamp corresponding to said selected node;
      computer readable program code means for determining whether said selected node is one of said group nodes; and
      computer readable program code means for propagating said updated timestamp to each of said group nodes subordinate to said selected group node in said hierarchical structure when said computer readable program code means for determining has a positive result.

3. The computer program product according to claim 2, further comprising:
   computer readable program code means for retrieving a coalesced result in response to a request from a particular one of said users, wherein said request may specify a refreshed result or an unrefreshed result.

4. The computer program product according to claim 3, wherein said computer readable program code means for retrieving a refreshed result further comprises:
   computer readable program code means for retrieving said user data for said particular user, further comprising:
      computer readable program code means for retrieving said user data from said client cache when (1) said client cache for said particular user exists and (2) said client cache timestamp for said particular user's client cache is not older than said last update timestamp corresponding to said particular user's user node in said repository; and
      computer readable program code means for populating said particular user's client cache otherwise, wherein said populating further comprises:
         computer readable program code means for retrieving said user data from said particular user's user node in said repository;
         computer readable program code means for storing said retrieved user data in said client cache for said user; and
         computer readable program code means for setting said client cache timestamp for said user to said last update timestamp for said corresponding user node; and
   computer readable program code means for retrieving said CDI for said group node of which said user node is one of said children, further comprising:
      computer readable program code means for retrieving said CDI from said central data cache when (1) said CDI for said group node exists and (2) said CDI timestamp for said CDI is not older than said last update timestamp corresponding to said group node in said repository; and
      computer readable program code means for creating said CDI otherwise, wherein said creating further comprises:

computer readable program code means for retrieving said data values from said repository for said group node, said top-level node, and all of said intermediate-level nodes in said hierarchical path from said group node to said top-level node;
computer readable program code means for coalescing said retrieved data values;
computer readable program code means for storing said coalesced data values as said CDI for said group node in said central data cache; and
computer readable program code means for setting said CDI timestamp for said CDI to said last update timestamp for said corresponding group node; and
computer readable program code means for merging said retrieved user data with said retrieved CDI.

5. The computer program product according to claim 3, wherein said computer readable program code means for retrieving an unrefreshed result further comprises:
computer readable program code means for retrieving said user data for said particular user, further comprising:
computer readable program code means for retrieving said user data from said client cache when said client cache for said particular user exists; and
computer readable program code means for populating said particular user's client cache otherwise, wherein said populating further comprises:
computer readable program code means for retrieving said user data from said particular user's user node in said repository;
computer readable program code means for storing said retrieved user data in said client cache for said user; and
computer readable program code means for setting said client cache timestamp for said user to said last update timestamp for said corresponding user node;
computer readable program code means for retrieving said CDI for said group node of which said user node is one of said children, further comprising:
computer readable program code means for retrieving said CDI from said central data cache when said CDI for said group node exists; and
computer readable program code means for creating said CDI otherwise, wherein said creating further comprises:
computer readable program code means for retrieving said data values from said repository for said group node, said top-level node, and all of said intermediate-level nodes in said hierarchical path from said group node to said top-level node;
computer readable program code means for coalescing said retrieved data values;
computer readable program code means for storing said coalesced data values as said CDI for said group node in said central data cache; and
computer readable program code means for setting said CDI timestamp for said CDI to said last update timestamp for said corresponding group node; and
computer readable program code means for merging said retrieved user data with a parent CDI associated with a parent node of said user node.

6. The computer program product according to claim 4, wherein said computer readable program code means for creating further comprises:
computer readable program code means for repeating said creating for each of said group nodes above said group node in said hierarchical path until reaching a first of said group nodes for which said CDI timestamp for said CDI of said first group node is not older than said last update timestamp corresponding to said group node in said repository.

7. The computer program product according to claim 4, wherein:
said computer readable program code means for retrieving said user data from said client cache determines whether said client cache timestamp for said particular user's client cache is different from said last update timestamp corresponding to said particular user's user node in said repository rather than whether said client cache timestamp is not older than said last update timestamp; and
said computer readable program code means for retrieving said CDI from said central data cache determines whether said CDI timestamp for said CDI is different from said last update timestamp corresponding to said group node in said repository rather than whether said CDI timestamp is not older than said last update timestamp.

8. A system for using a two-tiered cache for storing and accessing hierarchical data, comprising:
a hierarchical structure of data comprising a top-level node, one or more intermediate levels having one or more intermediate-level nodes, and one or more user nodes, wherein each of said user nodes is a child node of said top-level node or one of said intermediate-level nodes, wherein said hierarchical structure is stored in a data repository accessible in said computing environment and wherein each of said nodes has a corresponding last update timestamp stored in said repository, said last update timestamp for said user nodes and said top-level node representing a last update to one or more data values of said node and said last update timestamp for said intermediate nodes representing an update of data values of said intermediate node or a parent of said intermediate node;
means for creating coalesced data images (CDIs) for each of said top-level or intermediate-level nodes which is a group node, wherein a particular node is one of said group nodes when said particular node has one or more of said user nodes as a child, and wherein said CDI for said particular node comprises a coalescence of data values for said particular node, said top-level node, and all of said intermediate-level nodes in a hierarchical path from said particular node to said top-level node;
means for storing said created CDIs in a central data cache along with a CDI timestamp for each of said stored CDIs wherein said CDI timestamp for each of said CDIs is set to said corresponding last update timestamp for said corresponding node; and
means for storing user data for each of one or more users in a client cache for said user along with a client cache timestamp, wherein: each of said users is associated with a selected one of said user nodes; said client cache timestamp is set to said corresponding last update timestamp for said corresponding user node; and said stored user data is uncoalesced.

9. The system according to claim 8, further comprising:
means for updating one or more of said data values for a selected node, further comprising:
means for applying an update to said data values in said repository;

means for updating said last update timestamp corresponding to said selected node;

means for determining whether said selected node is one of said group nodes; and means for propagating said updated timestamp to each of said group nodes subordinate to said selected group node in said hierarchical structure when said means for determining has a positive result.

10. The system according to claim 9, further comprising:
means for retrieving a coalesced result in response to a request from a particular one of said users, wherein said request may specify a refreshed result or an unrefreshed result.

11. The system according to claim 10, wherein said means for retrieving a refreshed result further comprises:
means for retrieving said user data for said particular user, further comprising:
means for retrieving said user data from said client cache when (1) said client cache for said particular user exists and (2) said client cache timestamp for said particular user's client cache is not older than said last update timestamp corresponding to said particular user's user node in said repository; and
means for populating said particular user's client cache otherwise, wherein said populating further comprises:
means for retrieving said user data from said particular user's user node in said repository;
means for storing said retrieved user data in said client cache for said user; and
means for setting said client cache timestamp for said user to said last update timestamp for said corresponding user node;
means for retrieving said CDI for said group node of which said user node is one of said children, further comprising:
means for retrieving said CDI from said central data cache when (1) said CDI for said group node exists and (2) said CDI timestamp for said CDI is not older than said last update timestamp corresponding to said group node in said repository; and
means for creating said CDI otherwise, wherein said creating further comprises:
means for retrieving said data values from said repository for said group node, said top-level node, and all of said intermediate-level nodes in said hierarchical path from said group node to said top-level node;
means for coalescing said retrieved data values;
means for storing said coalesced data values as said CDI for said group node in said central data cache; and
means for setting said CDI timestamp for said CDI to said last update timestamp for said corresponding group node; and
means for merging said retrieved user data with said CDI of said parent node.

12. The system according to claim 10, wherein said means for retrieving an unrefreshed result further comprises:
means for retrieving said user data for said particular user, further comprising:
means for retrieving said user data from said client cache when said client cache for said particular user exists; and
means for populating said particular user's client cache otherwise, wherein said populating further comprises:
means for retrieving said user data from said particular user's user node in said repository;
means for storing said retrieved user data in said client cache for said user; and
means for setting said client cache timestamp for said user to said last update timestamp for said corresponding user node;
means for retrieving said CDI for said group node of which said user node is one of said children, further comprising:
means for retrieving said CDI from said central data cache when said CDI for said group node exists; and
means for creating said CDI otherwise, wherein said creating further comprises:
means for retrieving said data values from said repository for said group node, said top-level node, and all of said intermediate-level nodes in said hierarchical path from said group node to said top-level node;
means for coalescing said retrieved data values;
means for storing said coalesced data values as said CDI for said group node in said central data cache; and
means for setting said CDI timestamp for said CDI to said last update timestamp for said corresponding group node; and
means for merging said retrieved user data with a parent CDI associated with a parent node of said user node.

13. The system according to claim 11, wherein said means for creating further comprises:
means for repeating said creating for each of said group nodes above said group node in said hierarchical path until reaching a first of said group nodes for which said CDI timestamp for said CDI of said first group node is not older than said last update timestamp corresponding to said group node in said repository.

14. The system according to claim 11, wherein:
said means for retrieving said user data from said client cache determines whether said client cache timestamp for said particular user's client cache is different from said last update timestamp corresponding to said particular user's user node in said repository rather than whether said client cache timestamp is not older than said last update timestamp; and
said means for retrieving said CDI from said central data cache determines whether said CDI timestamp for said CDI is different from said last update timestamp corresponding to said group node in said repository rather than whether said CDI timestamp is not older than said last update timestamp.

15. A method for using a two-tiered cache for storing and accessing hierarchical data, comprising the steps of:
providing a hierarchical structure of data comprising a top-level node, one or more intermediate levels having one or more intermediate-level nodes, and one or more user nodes, wherein each of said user nodes is a child node of said top-level node or one of said intermediate-level nodes, wherein said hierarchical structure is stored in a data repository accessible in said computing environment and wherein each of said nodes has a corresponding last update timestamp stored in said repository, said last update timestamp for said user nodes and said top-level node representing a last update to one or more data values of said node and said last update timestamp for said intermediate nodes representing an update of data values of said intermediate node or a parent of said intermediate node;

creating coalesced data images (CDIs) for each of said top-level or intermediate-level nodes which is a group node, wherein a particular node is one of said group nodes when said particular node has one or more of said user nodes as a child, and wherein said CDI for said particular node comprises a coalescence of data values for said particular node, said top-level node, and all of said intermediate-level nodes in a hierarchical path from said particular node to said top-level node;

storing said created CDIs in a central data cache along with a CDI timestamp for each of said stored CDIs wherein said CDI timestamp for each of said CDIs is set to said corresponding last update timestamp for said corresponding node; and storing user data for each of one or more users in a client cache for said user along with a client cache timestamp, wherein: each of said users is associated with a selected one of said user nodes; said client cache timestamp is set to said corresponding last update timestamp for said corresponding user node; and said stored user data is uncoalesced.

16. The method according to claim 15, further comprising the step of:
updating one or more of said data values for a selected node, further comprising the steps of:
applying an update to said data values in said repository;
updating said last update timestamp corresponding to said selected node;
determining whether said selected node is one of said group nodes; and
propagating said updated timestamp to each of said group nodes subordinate to said selected group node in said hierarchical structure when said determining step has a positive result.

17. The method according to claim 16, further comprising the step of:
retrieving a coalesced result in response to a request from a particular one of said users, wherein said request may specify a refreshed result or an unrefreshed result.

18. The method according to claim 17, wherein said retrieving a refreshed result step further comprises the steps of:
retrieving said user data for said particular user, further comprising the steps of:
retrieving said user data from said client cache when (1) said client cache for said particular user exists and (2) said client cache timestamp for said particular user's client cache is not older than said last update timestamp corresponding to said particular user's user node in said repository; and
populating said particular user's client cache otherwise, wherein said populating further comprises the steps of:
retrieving said user data from said particular user's user node in said repository;
storing said retrieved user data in said client cache for said user; and
setting said client cache timestamp for said user to said last update timestamp for said corresponding user node;
retrieving said CDI for said group node of which said user node is one of said children, further comprising the steps of:
retrieving said CDI from said central data cache when (1) said CDI for said group node exists and (2) said CDI timestamp for said CDI is not older than said last update timestamp corresponding to said group node in said repository; and
creating said CDI otherwise, wherein said creating further comprises the steps of:
retrieving said data values from said repository for said group node, said top-level node, and all of said intermediate-level nodes in said hierarchical path from said group node to said top-level node;
coalescing said retrieved data values;
storing said coalesced data values as said CDI for said group node in said central data cache; and
setting said CDI timestamp for said CDI to said last update timestamp for said corresponding group node; and
merging said retrieved user data with said CDI of said parent node.

19. The method according to claim 17, wherein said retrieving an unrefreshed result step further comprises the steps of:
retrieving said user data for said particular user, further comprising the steps of:
retrieving said user data from said client cache when said client cache for said particular user exists; and
populating said particular user's client cache otherwise, wherein said populating step further comprises the steps of:
retrieving said user data from said particular user's user node in said repository;
storing said retrieved user data in said client cache for said user; and
setting said client cache timestamp for said user to said last update timestamp for said corresponding user node;
retrieving said CDI for said group node of which said user node is one of said children, further comprising the steps of:
retrieving said CDI from said central data cache when said CDI for said group node exists; and
creating said CDI otherwise, wherein said creating step further comprises the steps of:
retrieving said data values from said repository for said group node, said top-level node, and all of said intermediate-level nodes in said hierarchical path from said group node to said top-level node;
coalescing said retrieved data values;
storing said coalesced data values as said CDI for said group node in said central data cache; and
setting said CDI timestamp for said CDI to said last update timestamp for said corresponding group node; and
merging said retrieved user data with a parent CDI associated with a parent node of said user node.

20. The method according to claim 18, wherein said creating step further comprises the step of:
repeating said creating step for each of said group nodes above said group node in said hierarchical path until reaching a first of said group nodes for which said CDI timestamp for said CDI of said first group node is not older than said last update timestamp corresponding to said group node in said repository.

21. The method according to claim 18, wherein:
said retrieving said user data from said client cache step determines whether said client cache timestamp for said particular user's client cache is different from said last update timestamp corresponding to said particular user's user node in said repository rather than whether said client cache timestamp is not older than said last update timestamp; and said retrieving said CDI from said central data cache step determines whether said CDI timestamp for said CDI is different from said last update timestamp corresponding to said group node in said repository rather than whether said CDI timestamp is not older than said last update timestamp.

* * * * *